(12) United States Patent
Born

(10) Patent No.: US 6,570,824 B1
(45) Date of Patent: May 27, 2003

(54) GENERATOR FOR A TIMEPIECE

(75) Inventor: Jean-Jacques Born, Morges (CH)

(73) Assignee: Asulab S.A., Bienne (CH)

( * ) Notice: Subject to any disclaimer, the term of this patent is extended or adjusted under 35 U.S.C. 154(b) by 59 days.

(21) Appl. No.: 09/699,385

(22) Filed: Oct. 31, 2000

(30) Foreign Application Priority Data

Nov. 12, 1999 (EP) .......................................... 99122597

(51) Int. Cl.[7] .......................... G04B 1/00; H01M 10/46
(52) U.S. Cl. ...................... 368/203; 368/204; 368/160; 368/64; 310/180
(58) Field of Search .......................... 368/64, 160, 203, 368/204; 310/180, 184, 261–266, 156

(56) References Cited

U.S. PATENT DOCUMENTS

| | | | |
|---|---|---|---|
| 3,747,320 A | * | 7/1973 | Vuffray |
| 4,125,791 A | * | 11/1978 | Futterer .................. 310/266 |
| 4,939,707 A | * | 7/1990 | Nagao ..................... 368/204 |
| 5,030,867 A | * | 7/1991 | Yamada et al. ........... 310/180 |
| 5,039,895 A | * | 8/1991 | Meister ................... 310/184 |
| 5,081,388 A | * | 1/1992 | Chen ....................... 310/266 |
| 5,361,010 A | * | 11/1994 | Muller .................... 310/180 |
| 5,579,290 A | * | 11/1996 | Zafferri et al. ........... 368/76 |
| 6,469,959 B1 | * | 10/2002 | Born ....................... 368/203 |

FOREIGN PATENT DOCUMENTS

| | | |
|---|---|---|
| DE | 18 11 389 | 9/1959 |
| EP | 751 445 | 1/1997 |

OTHER PUBLICATIONS

"Salto—an Automatically Wound Mechanical Movement With the Precision of a Quartz Movement" (English translation of French title), Born et al., Swiss Chronometry Society, "SSC Study Days 1997", pp. 55 to 63.

* cited by examiner

Primary Examiner—Vit Miska
Assistant Examiner—Jeanne-Marguerite Goodwin
(74) Attorney, Agent, or Firm—Sughrue Mion, PLLC

(57) ABSTRACT

Generator of the clockwork type including a stator formed of at least three coils (11a, 11b, 11c) and a rotor formed of two flanges (81, 82) carried by a shaft (5) and supporting an even number of magnets (91, 92). The rotor is formed of at least two distinct parts prior to assembly with the stator. In order to assemble the rotor, its shaft is introduced into a central space (13) defined by the coils coaxially to the axes of said coils, which thus allows the coils to be closer together so that the distance separating any two adjacent coils is less than the diameter D of said shaft (5) at its center.

8 Claims, 4 Drawing Sheets

GENERATOR FOR A TIMEPIECE

BACKGROUND OF THE INVENTION

The present invention relates to a clockwork movement fitted with a generator, in particular for a wristwatch.

The use of batteries or accumulators is a factor limiting the features of the apparatus, for all applications, and in particular for a watch. Indeed, changing or recharging the batteries or accumulators affects the availability and reliability of the watch.

In this context, the conventional mechanical watch has a certain advantage in watchmaking know-how: such a watch is permanently available. The recharge of power—which is purely mechanical—is achieved simply by rewinding the watch mechanism.

This type of watch uses a manual or automatic winding device generally coupled to a regulating device commonly called a "Swiss lever escapement". It is difficult to obtain a high level of precision with this regulating device. This system is also relatively expensive.

The other large family concerns the conventional quartz watch. A battery simultaneously powers an electric motor and a device for regulating the working of the motor. The motor rotation is controlled by a nominal frequency supplied by a quartz. This provides a high level of precision for the time indication. However, this device is relatively noisy since the forward movement of the second wheel is saccadic and the battery has to be changed periodically.

New types of watch have been made combining the two aforecited systems and exploiting their respective advantages. In these constructions, mechanical power storage has been associated with quartz regulation, supplied with electric power by a generator driven by a mechanical part coupled with a power storage spring.

The article by MM Born, Dinger and Farine "Salto—An automatically wound mechanical movement with the precision of a quartz movement" which appeared in the Swiss Chronometry Society publication "SSC study days 1997", pages 55 to 63 may also be cited as the corresponding state of the art.

The arrangement of the generator according to this prior art is illustrated in FIG. 1 annexed hereto, showing a top view of a partially assembled clockwork movement, and in FIG. 2 annexed hereto, which is a cross-section of FIG. 1. This generator includes a rotor with two flanges 8 arranged on either side of three flat coils 11 forming the stator and offset by 120° with respect to each other relative to the rotor axis, in a same orthogonal plane thereto.

Six magnets 9 are fixed radially and at regular intervals on each flange 8, facing coils 11. Two consecutive or facing magnets 9 have opposite polarity. A printed circuit 6 is secured to plate 4 and is used as a support for coils 11.

Electric circuit 10, which has a low power consumption, is powered by an electric generator—formed by the shaft assembly of rotor 5, flanges 8, magnets 9 and coils 11—driven via the kinematic connection 3 by barrel device 2. The mechanical power stored in barrel 2 thus drives the rotor. The passage of magnets 9 in proximity to coils 11 generates a substantially sinusoidal induced voltage across the terminals of coils 11.

FIG. 3 annexed hereto demonstrates schematically the fact that the assembly of the monoblock rotor—formed of parts 5, 8 and 9 in the completed device is currently achieved by inserting shaft 5 laterally between two fixed coils 11. The monoblock rotor cannot be inserted vertically since the three coils 11 are fixed and flanges 8 located on either side of these coils must partially cover them. As is clear in particular from FIGS. 2 and 3 of the aforecited document, coils 11 have a space, referenced Dmin in FIG. 3 annexed hereto, at least as wide as rotor shaft 5, having a diameter D at its centre, to allow the shaft to be inserted laterally until it is placed definitively at the centre of the three coils. Because of the space thereby arranged between the three coils 11 offset angularly by 120°, a mediocre covering of coils 11 is obtained by magnets 9, which causes a drop in the yield of the micro-generator, and a relatively large space requirement. In other words, the number of turns of coils 11 superposed onto flanges 8 carrying magnets 9 at their periphery is limited.

SUMMARY OF THE INVENTION

The object of the invention is to overcome these drawbacks. The invention therefore concerns a generator of the clockwork type including on the one hand a rotor including two flanges carried by a shaft, this shaft and the flanges being fixed in rotation when operating, magnets, even in numbers, being fixed to each flange—two consecutive or facing magnets having opposite polarity—and including on the other hand a stator formed of at least three coils with axes parallel to that of the rotor, and arranged on a support, these coils being arranged between the two flanges fitted with magnets after the generator is assembled and arranging between them a sufficient central space for said rotor shaft. This generator is characterised in that the rotor is formed of at least two distinct parts prior to its assembly to said stator which each include one of the two flanges so that the generator is assembled by introducing the rotor shaft in said central space arranged between the coils in a direction perpendicular to the general plane defined by the coils, the distance separating any two adjacent coils being less than diameter D of said shaft at its centre.

The space separating two adjacent coils can thus be reduced and even removed for certain dimension of the coils.

DETAILED DESCRIPTION OF THE INVENTION

Figure 1:
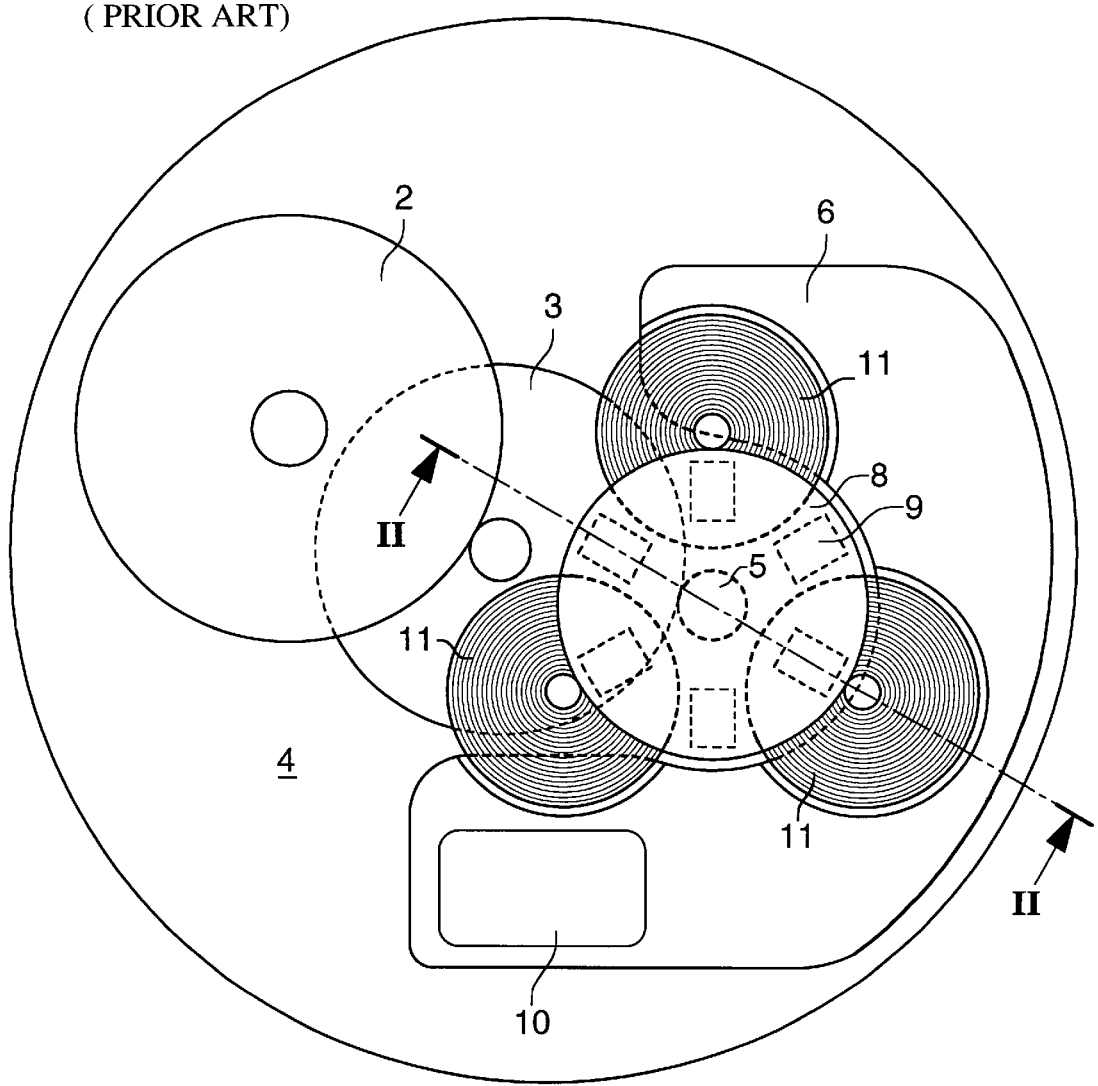
FIGS. 1–3 illustrate a prior art generator as described above.
Figure 2:
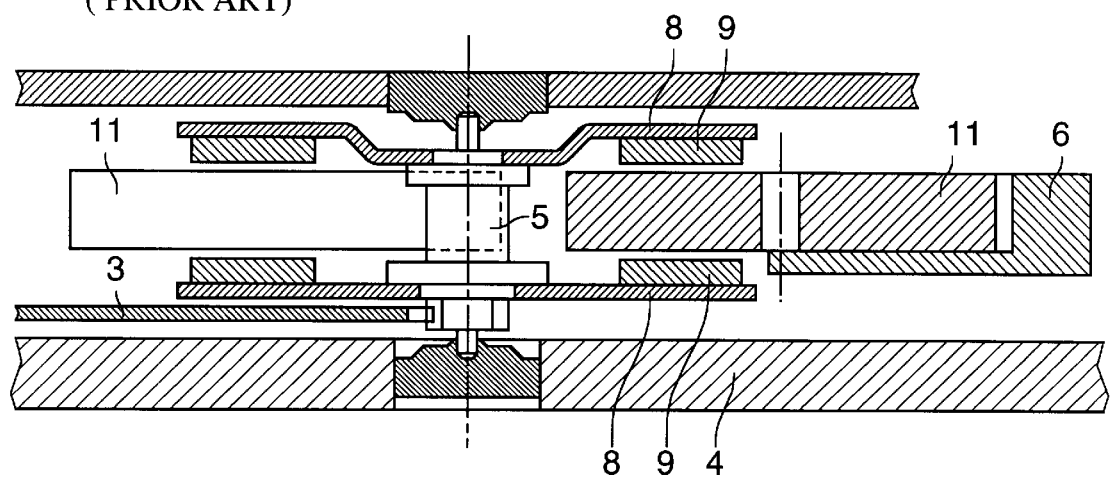
Figure 3:
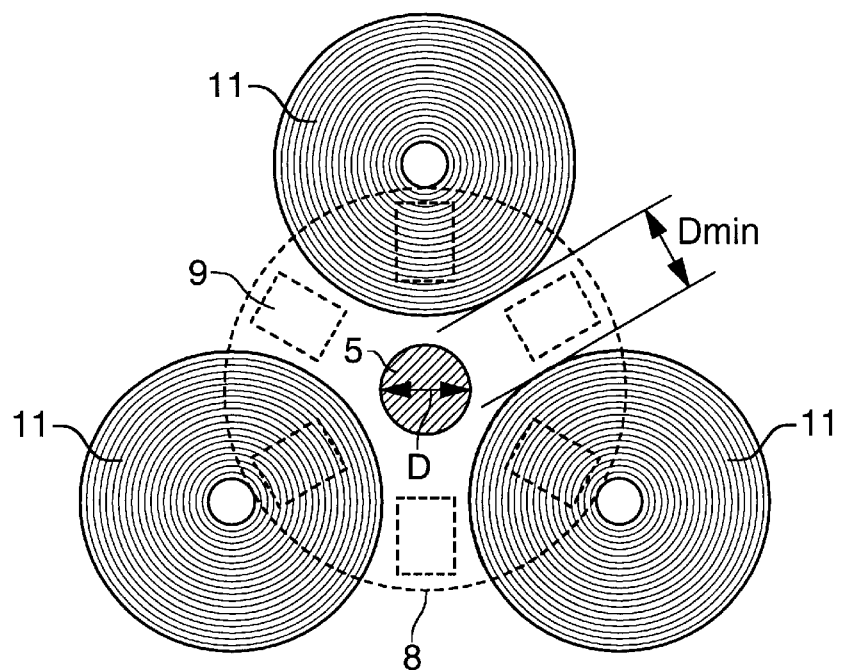
Figure 4:
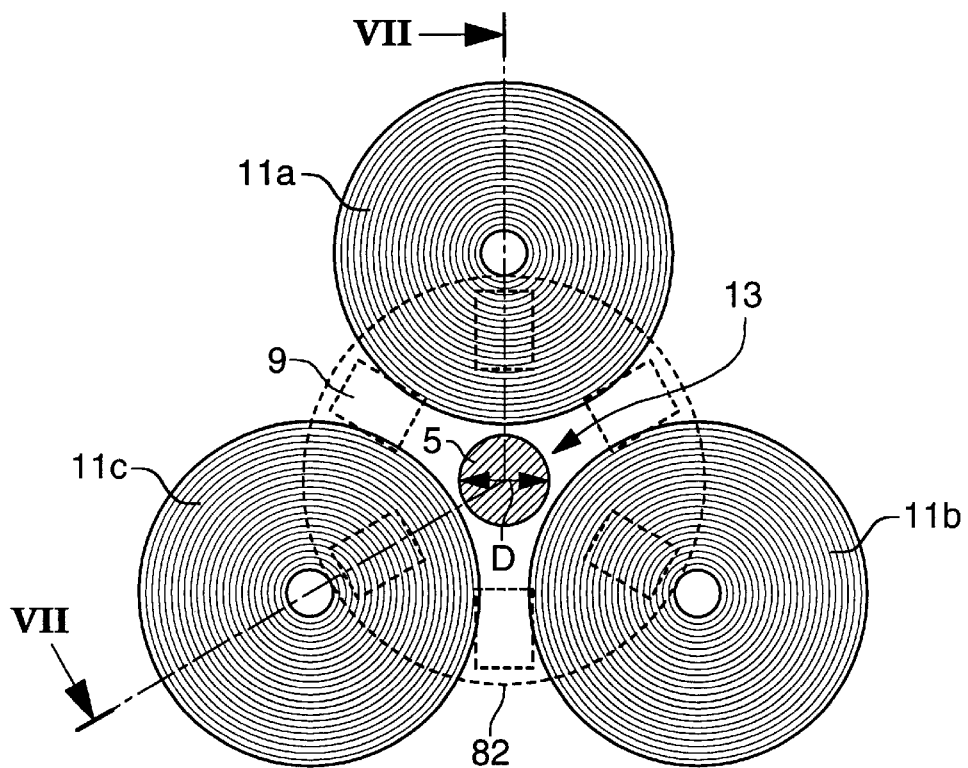
FIG. 4 is cross-section similar to FIG. 3, of a first embodiment of the generator according to the invention along a plane parallel to the rotor flanges.
Figure 5:
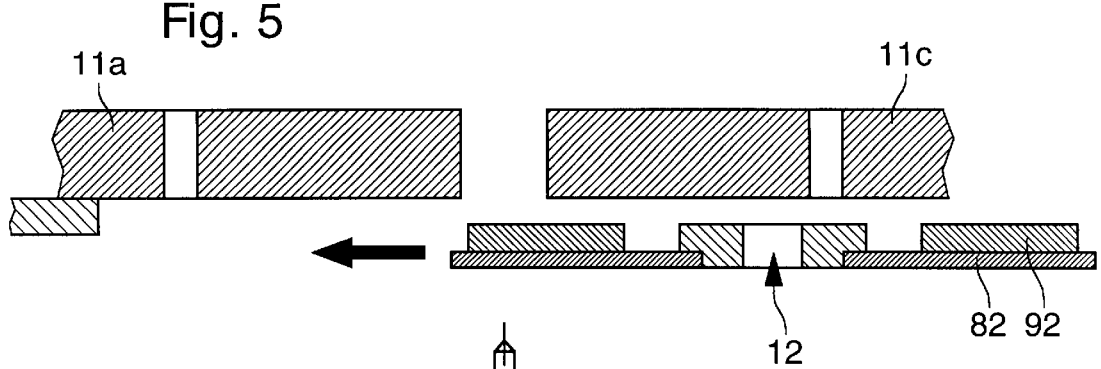
FIGS. 5, 6 and 7 are cross-sections along the dotted line of FIG. 4 detailing the assembly steps of the generator of FIG. 4.
Figure 6:
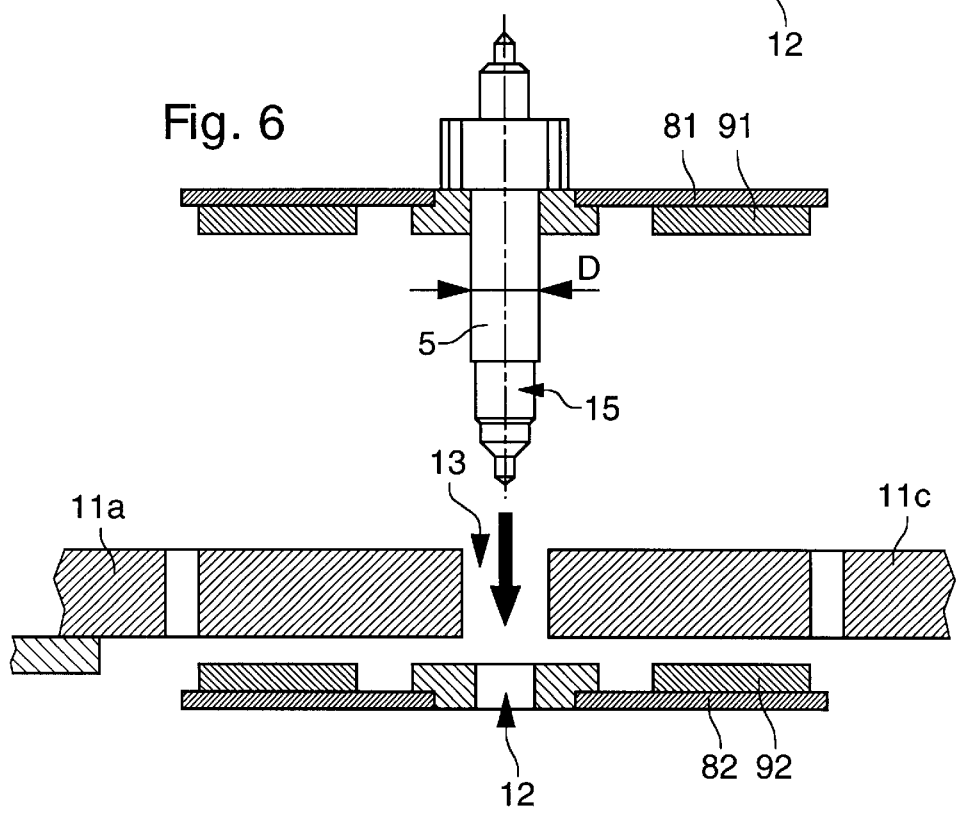

With reference to the assembly of FIGS. 4 to 7, and in particular to FIG. 6, it can be observed that the rotor shaft 5 is securely fixed to top flange 81. The bottom flange 82 includes a bore 12 at its centre. Rotor shaft 5 is introduced into this bore 12 after having been freely introduced into the central space 13 delimited by three coils 11a, 11b, 11c. Magnets 91 and 92 are identical to those previously designated in FIG. 2 by the reference 9. Thus the rotor is mounted axially and not radially as in the prior art.

According to a particular alternative embodiment, flanges 81 and 82 are held assembled facing each other as a result of the mutual sufficient magnetic attraction exerted by magnets 91 on magnets 92 of opposite polarity. In this case, flange 82 is not rigidly fixed to shaft 5 so that the assembly and dismantling of the rotor is easily achieved.

With reference to FIG. 4, it can be seen that central space 13 arranged at the centre of the three cylindrical coils 11*a*, 11*b* and 11*c* is sufficient to introduce rotor shaft 5 vertically, i.e. coaxially to the axes of the coils and the rotor, while the distance separating two adjacent coils is less than diameter D of shaft 5 at its centre.

The rotor according to the invention has two parts prior to assembly of the generator. It is then mounted axially so that these two parts are secured to each other in rotation, either by mechanical coupling or by magnetic coupling. The first part here is formed of top flange 81 fitted with its magnets 91 and mechanically secured to shaft 5 prior to assembly. The second part is formed of bottom flange 82 and its magnets 92. The arrangement according to the invention thus allows the distance separating coils 11*a*, 11*b*, 11*c* to be reduced and thus the covering of these coils by magnets 91 and 92 to be increased. This modification results in an increase in the generator yield or increased compactness of the latter for a given yield.

FIG. 5 shows the first assembly phase. Coils 11, of which there are three, are already fixed onto their support. In a variant, a space arranged under coils 11*a*, 11*b*, 11*c* allows bottom flange 82 to be slid into its place. In another variant, the bottom flange may be placed in a housing before the coils are added or simultaneously with the latter.

FIG. 6 shows the following assembly phase, wherein shaft 5 carrying flange 81 is presented vertically in central space 13 arranged between the three coils, before being inserted finally into bore 12 of flange 82.

Figure 7:
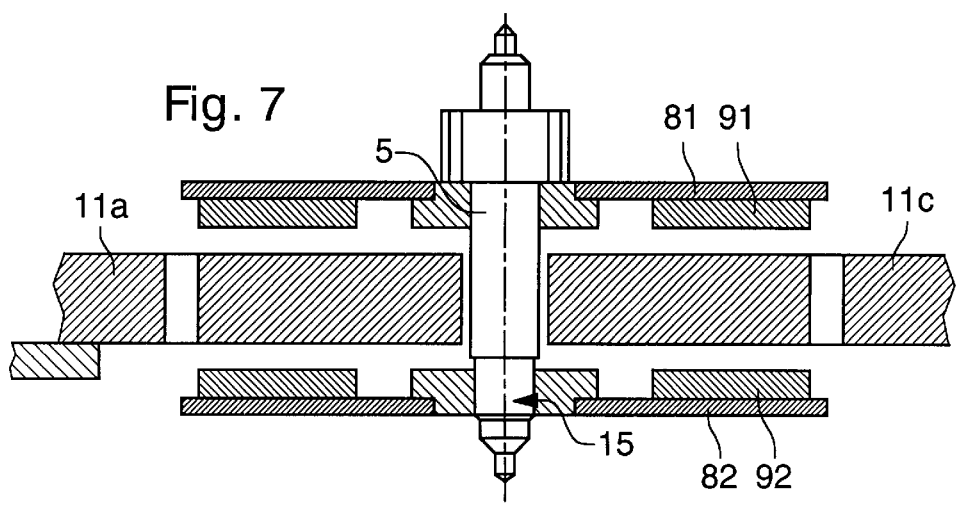

FIG. 7 shows the assembled rotor. According to a preferred variant, the connection between parts 5 and 82 is held as a result of the magnetic force which magnets 91 and 92 exert between each other as well as the relative angular positioning of the two flanges 81 and 82.

In another variant, hole 12 in the central portion of flange 82 and portion 15 of shaft 5 inserted in this hole have complementary non circular profiles. Thus, flanges 81 and 82 are mechanically secured in rotation, without it being necessary to drive or bond shaft 5 into flange 82. However, these latter variants may also be envisaged.

Figure 8:
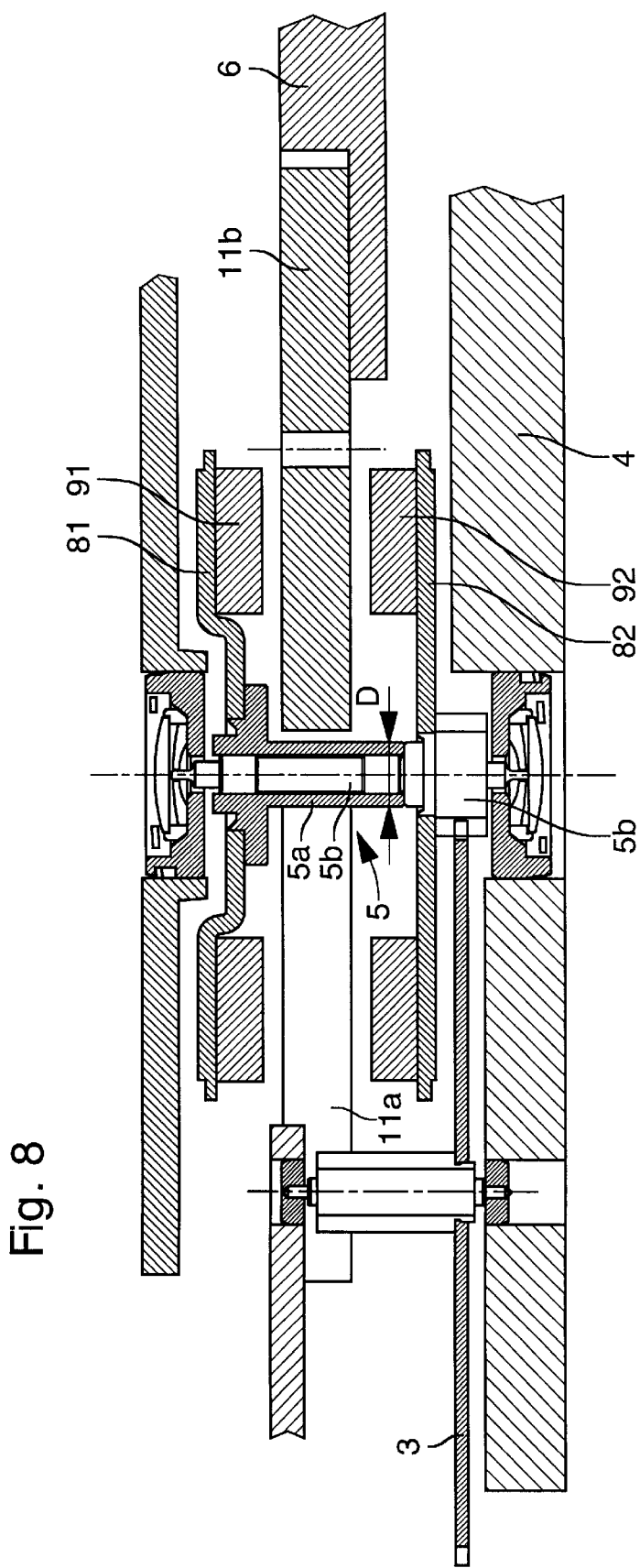
FIG. 8 is a cross-section, similar to FIG. 2, of a second embodiment of the generator according to the invention.

In a second embodiment shown in cross-section in FIG. 8, shaft 5 is in two parts 5*a* and 5*b* to which the two flanges 81 and 82 are respectively fixed.

Part 5*a* includes a tube extending substantially between the two flanges 81 and 82. One end of the tube rests on a shoulder of part 5*b*. This part 5*b* includes a pin introduced into the tube of part 5*a*. This pin has two projecting portions used as contact surfaces with the inner surface of the tube.

A slide friction fit is provided between the pin and the tube. The two projecting portions allow the friction to be limited so that the magnetic forces are sufficient to allow angular self-positioning relative to flanges 81 and 82. The assembly is achieved in a similar way to that shown with reference to FIGS. 5 to 7. This embodiment is advantageous compared to the first embodiment described above in that parts 5*a* and 5*b* can be aligned precisely. The tube provided allows precise guiding of the pin given that both extend into the central region defined by the coils.

It will be noted that in the aforementioned embodiments and variants, the coils can be assembled to the clockwork movement prior to assembly of the rotor or after such assembly. In the latter case which may prove advantageous for the assembly of the clockwork movement, the generator is thus arranged in the clockwork movement after the rotor has been assembled in the manner described above, in particular using a mounting arrangement provided for this purpose.

In an alternative embodiment wherein the generator is assembled prior to assembly in the clockwork movement, part 15 of shaft 5 can be more easily driven into the central part of flange 82. As an alternative, welding or bonding may also be envisaged. When the generator is added to the clockwork movement, the top magnets of the rotor rest on coils 11*a*, 11*b*, 11*c* fixed onto a support. This support may form a printed circuit onto which the ends of the coils are bonded.

What is claimed is:

1. A generator of a clockwork type including a rotor including two flanges carried by a rotor shaft having an axis and a diameter D at its center, magnets, even in number, each being fixed to each flange, two consecutive or facing magnets having opposite polarity, said generator including a stator formed of at least three coils with axes parallel to that of said rotor and fixed onto a support, said coils being arranged between the two flanges, fitted with magnets after the generator is assembled, and defining between them a sufficient central space for the rotor shaft, wherein said rotor is formed of at least two distinct parts, prior to the assembly of said generator, which each include one of the two flanges so that said generator is assembled by introducing said rotor shaft coaxially to the axes of said coils into said central space defined between the coils, any two adjacent ones of said coils being separated by a distance less than said diameter D of said rotor shaft.

2. A generator according to claim 1, wherein said rotor includes a tube and a pin belonging respectively to the two distinct parts, this pin being introduced into said tube with a friction slide fit when said generator is assembled, said tube and said pin both extending into said central region defined by said coils.

3. A generator according to claim 1, wherein after assembly, said rotor is held assembled by magnetic attraction exerted by the magnets of one flange on the magnets of the other flange.

4. A watch comprising a movement fitted with a generator including a rotor including two flanges carried by a rotor shaft having an axis and a diameter D at its center, magnets, even in number, each being fixed to each flange, two consecutive or facing magnets having opposite polarity, said generator including a stator formed of at least three coils with axes parallel to that of said rotor and fixed onto a support, said coils being arranged between the two flanges, fitted with magnets after the generator is assembled, and defining between them a sufficient central space for the rotor shaft, wherein said rotor is formed of at least two distinct parts, prior to the assembly of said generator, which each include one of the two flanges so that said generator is assembled by introducing said rotor shaft coaxially to the axes of said coils into said central space defined between the coils, any two adjacent ones of said coils being separated by a distance less than said diameter D of said rotor shaft.

5. A generator according to claim 4, wherein said rotor includes a tube and a pin belonging respectively to the two distinct parts, this pin being introduced into said tube with a friction slide fit when said generator is assembled, said tube and said pin both extending into said central region defined by said coils.

6. A generator according to claim 5, wherein after assembly, said rotor is held assembled by the magnetic attraction exerted by the magnets of one flange on the magnets of the other flange.

7. A watch according to claim 6, wherein said support carrying the coils is fixed to said movement prior to the assembly of said two distinct parts of said rotor.

8. A generator according to claim 2, wherein after assembly, said rotor is held assembled by magnetic attraction exerted by the magnets of one, flange on the magnets of the other flange.

* * * * *